US006837074B2

(12) United States Patent
Cocchini et al.

(10) Patent No.: US 6,837,074 B2
(45) Date of Patent: Jan. 4, 2005

(54) METHOD OF MEASURING THE TWIST IMPARTED TO AN OPTICAL FIBRE AND PROCEDURE FOR PROCESSING AN OPTICAL FIBRE USING THIS METHOD

(75) Inventors: Franco Cocchini, Cava dei Tirreni (IT); Arturo Ricco, Battipaglia (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 300 days.

(21) Appl. No.: 10/133,359

(22) Filed: Apr. 29, 2002

(65) Prior Publication Data

US 2002/0178758 A1 Dec. 5, 2002

Related U.S. Application Data

(63) Continuation of application No. PCT/EP00/10248, filed on Oct. 18, 2000.
(60) Provisional application No. 60/163,570, filed on Nov. 5, 1999.

(51) Int. Cl.$^7$ ............................................... C03B 37/07
(52) U.S. Cl. .............................. 65/382; 65/402; 65/435; 65/438; 65/443; 65/447
(58) Field of Search ......................... 65/382, 402, 438, 65/443, 447, 435, 475, 477, 430, 432, 378

(56) References Cited

U.S. PATENT DOCUMENTS

| | | | |
|---|---|---|---|
| 4,280,827 A | | 7/1981 | Murphy et al. |
| 4,744,935 A | | 5/1988 | Priaroggia et al. |
| 4,887,155 A | | 12/1989 | Massen |
| 4,891,974 A | | 1/1990 | Wassenhoven |
| 4,969,941 A | | 11/1990 | Kyoto et al. |
| 5,114,338 A | | 5/1992 | Tsuchiya et al. |
| 5,298,047 A | | 3/1994 | Hart, Jr. et al. |
| 5,366,527 A | | 11/1994 | Amos et al. |
| 5,418,881 A | | 5/1995 | Hart, Jr. et al. |
| 5,551,967 A | * | 9/1996 | Urruti .......................... 65/378 |
| 5,661,553 A | | 8/1997 | Auge et al. |
| 5,943,466 A | * | 8/1999 | Henderson et al. .......... 385/123 |
| 6,240,748 B1 | * | 6/2001 | Henderson et al. ............ 65/402 |
| 2004/0017557 A1 | * | 1/2004 | Huang et al. ............... 356/73.1 |

FOREIGN PATENT DOCUMENTS

| | | |
|---|---|---|
| EP | 0 619 275 | 10/1994 |
| EP | 0 646 819 | 4/1995 |
| EP | 0 795 521 | 9/1997 |
| EP | 0 842 909 | 5/1998 |
| JP | 2001-013332 * 1/2001 | ............ G02B/6/00 |
| WO | WO 98/46536 | 10/1998 |

OTHER PUBLICATIONS

Mustafa A.G et al; "Measurement of Optical Fiber Diameter Using the Fast Fourier Transform"; Applied Optics vol. 19 No. 12; Jun. 15, 1980; pp. 2031–2033.*
Kiyoshi et al; "Production of Optical Fiber"; Patent Abstracts of Japan, of JP 61–256936 A, Nov. 14, 1986.
Toshiyuki; " Method for Continuously Measuring Diameter of Twisted Strand and Device Therefor", Patent Abstracts of Japan, of JP 07–324289 A, Dec. 12, 1995.
Masasahi; "Method for Detecting Twist of Glass Fiber"; Patent Abstracts of Japan, of JP 08–245232 A, Sep. 24, 1996, with English translation.
Keisuke; "Measurement of Twisted Pitch of Electric Wire and Cable"; Patent Abstracts of Japan, of JP 03–170807, Jul 24, 1991.
Katsumi; "Method and Apparatus for Detecting Abnormality of Twisted Wire"; Patent Abstracts of Japan, of JP 63–311110, Dec. 19, 1998.
Agrawal; "Fiber–Optic Communication System", The Institute of Optics, University of Rochester, pp. 32–39; $2^{nd}$ Edition; Copright 1997.
Askins et al.; "Technique for Controlling the Internal Rotation of Principal Axes in the Fabrication of Birefringent Fibers"; Journal of Lightwave Technology, vol. 6, No. 9, pp. 1402–1405, (1988).

* cited by examiner

Primary Examiner—Steven P. Griffin
Assistant Examiner—Carlos Lopez
(74) Attorney, Agent, or Firm—Finnegan, Henderson, Farabow, Garrett & Dunner, L.L.P.

(57) ABSTRACT

A method of measuring the twist imparted to an optical fibre includes the steps of advancing the optical fibre in a predetermined direction and at a predetermined velocity, imparting to the optical fibre, during the step of advancing, a twist about its axis, measuring the diameter of the optical fibre during the step of advancing, to generate a time-based signal indicating the diameter, and processing this signal to find a value indicating the imparted twist. The step of processing includes the principal steps of transforming in the frequency domain the signal relating to the measurement of the diameter, calculating the power spectrum of the signal thus obtained, distinguishing in this power spectrum the signal peaks correlated with the imparted twist, determining the maximum frequency associated with these signal peaks, and dividing the value of this maximum frequency by the value of the velocity of advance of the fibre to find the value indicating the imparted twist.

18 Claims, 6 Drawing Sheets

METHOD OF MEASURING THE TWIST IMPARTED TO AN OPTICAL FIBRE AND PROCEDURE FOR PROCESSING AN OPTICAL FIBRE USING THIS METHOD

CROSS REFERENCE TO RELATED APPLICATIONS

This application is a continuation of International Application No. PCT/EP00/10248 filed Oct. 18, 2000, the content of which is incorporated herein by reference, and claims the benefit of U.S. Provisional Application No. 60/163,570, filed Nov. 5, 1999, the content of which is incorporated herein by reference, and claims the right to priority based on European Application No. 99121543.5, filed Oct. 29, 1999.

BACKGROUND OF THE INVENTION

1. Field of the Invention

The present invention relates to a method for measuring the twist imparted to an optical fibre. The present invention also relates to a procedure for processing an optical fibre using this method of measurement.

For the purposes of the present invention, the term procedure for processing an optical fibre denotes any process in which an optical fibre is advanced in a predetermined direction, and a twist, the extent of which it would be useful to know, is imparted to it (voluntarily or involuntarily) during its advance. This process may be, for example, a procedure for producing an optical fibre (typically a drawing process) or a procedure for manufacturing an optical cable by a plurality of optical fibres.

2. Description of the Related Art

As is known from "Fiber-Optic Communication System", by Govind Agrawal, John Wiley and Sons, Inc., Second Edition, a single-mode optical fibre can be used to transmit two orthogonal modes (typically denoted TE and TM) which are degenerate, having the same value of a parameter n known as the mode index (or effective index) and defined as $n=\beta/k_0$, where $\beta$ is the constant of propagation and $k_0$ is the free-space wave number. The degenerate nature of the orthogonally polarized modes is present only in an ideal single-mode fibre with a perfectly cylindrical core of uniform diameter. According to the said document, real optical fibres have considerable variations in the shape of the core along their length. They may also undergo non-uniform stresses such that their cylindrical symmetry is disrupted. Because of these factors, the degeneration between the orthogonally polarized modes is removed, and the fibre acquires birefringence. The degree of birefringence is defined as $B=|n_x-n_y|$, where $n_x$ and $n_y$ are the mode indices for the orthogonally polarized modes.

A parameter of particular importance in the study of the birefringence of an optical fibre is what is known as the beat length, which, as described in U.S. Pat. No. 5,418,881 in the name of AT&T Corp., corresponds to the length of fibre required for a given state of polarization to be repeated. In other words, the beat length corresponds to the length of fibre required for the two components of the fundamental mode, initially in phase with each other, come to be in phase again, on the assumption that the fibre maintains a constant birefringence over this length.

Also according to Agrawal, when pulsed signals are transmitted in an optical fibre, the birefringence is a potential cause of the spreading of the pulses. This is because, if an input pulse excites both of the polarization components it becomes wider at the output of the fibre since the two components are dispersed along the fibre owing to their different group velocities. This phenomenon, known as polarization mode dispersion (PMD), has been widely studied in recent years because of its importance in periodically amplified light guide systems.

Typically, the phenomenon of PMD leads to a limitation of the width of the signal transmission band and, consequently, a degradation of the performance of the optical fibres along which the aforesaid signals are transmitted. This phenomenon is therefore undesirable in systems of signal transmission along optical fibres, especially in those operating over long distances, in which it is necessary to minimize any form of attenuation or dispersion of the signals to guarantee high performance in transmission and reception.

The Applicant has observed that the structural and geometrical irregularities of the optical fibre which give rise to birefringence may originate during the process of drawing the fibre. The process of drawing an optical fibre is typically carried out by means of suitable equipment known as a "drawing tower", starting from a glass preform. In practice, after the preform has been placed in a vertical position and heated to a temperature above the softening point, the molten material is drawn downwards at a controlled velocity in such a way as to produce a threadlike element which forms the optical fibre itself.

An example of a drawing process is described in U.S. Pat. No. 5,298,047 in the name of AT&T Bell Laboratories. In this process, a preform is first advanced inside a furnace and an optical fibre is drawn from a lower neck-shaped (necked down) portion of the preform. The fibre is then made to pass through a diameter monitor and then through a coating applicator, where a polymer coating is applied to the optical fibre which has now cooled. After this, the fibre is made to pass through a coating concentricity monitor, a curing station and a coating diameter monitor. Below this diameter monitor there are drive and guide means, which pull the fibre and guide it towards a take-up spool.

The Applicant has observed that, in a drawing process such as that described above, structural and geometrical defects of the preform, as well as undesired variations of the operating conditions of the process, may result in the presence of birefringence (and consequently of PMD) in the drawn fibre.

The aforesaid U.S. Pat. No. 5,298,047 proposes a method for imparting a torque to the optical fibre during the drawing process, in such a way as to produce a fibre with reduced PMD. This torque is imparted after the coating device, in the direction of advance of the optical fibre. In particular, this torque is imparted by making a guide roller of the optical fibre (forming part of the aforesaid drive and guide means), having its axis perpendicular to the axis of advance of the fibre, move in a suitable way, by alternate oscillations in the clockwise and anticlockwise directions.

Patent application EP 0795521 A1 in the name of Sumitomo Electric Industries relates to an improvement of the technique of U.S. Pat. No. 5,298,047, wherein the guide roller that follows the oscillating guide roller has a V-shaped, U-shaped or convex narrow groove to suppress rolling of the fiber on the surface thereof, which could influence the twist of the fiber, and wherein optical fiber responsive motion suppressing means are provided above the oscillating guide roller to avoid an excessive responsive motion of the fiber.

Patent application EP 0842909 in the name of FOS describes an alternative method of imparting an alternating twist to an optical fibre during the drawing process. This method requires the rotation of the device for applying the protective coating during the drawing process, in such a way that the rotation of this device is transmitted to the optical fibre.

As is known, for example from patent application EP 646819A1 in the name of AT&T Corp., in addition to the birefringence generated in an optical fibre during the drawing process, there may be other causes of birefringence, for example asymmetric stress conditions on the optical fibre caused by external stresses such as those which are present in a cabling process for the production of an optical cable.

As is known, for example from U.S. Pat. No. 4,744,935 in the name of Societa Cavi Pirelli S.p.A., an optical cable for submarine telecommunications may comprise an optical core in which are embedded a plurality of optical fibres for the transmission of optical signals and one or more outer reinforcing and protective coatings. The optical core may be of the type comprising a central supporting element and, around this, one or more layers of polymer material in which the optical fibres are embedded in fixed positions.

As described in patent application EP 646819A1 in the name of AT&T Corp., a process of fabricating the optical core of an optical cable may comprise:

heating a central strength member and extruding a first layer of thermoplastic elastomer onto the heated central strength member;

paying out optical fibres from a plurality of bobbins;

helically laying the optical fibres onto the first layer of thermoplastic elastomer;

passing the central strength member, coated with the first layer of thermoplastic material and wrapped by the optical fibres, through a helically rotating closing die to apply radially inward forces on the cable core, wherein no force is applied to the optical fibres tangentially to the thermoplastic material; and extruding a second layer of thermoplastic elastomer over the fibers to merge with the first layer.

The Applicant has observed that the performance in terms of PMD of a cabled optical fibre are generally a function of the changes of shape undergone by the optical fibre as a result of the cabling process. If an optical fibre has undergone a local deformation, there will be a local delay between the orthogonal propagation modes of the signals in the deformed region during the transmission of signals. The summation of the delays introduced along the optical fibre determines the PMD of the signals transmitted.

The method of imparting a twist to an optical fibre to reduce its birefringence can also be applied in a process of cabling the optical fibre to produce an optical cable.

The aforesaid patent application EP 646819A1 proposes a method for reducing the PMD of optical fibres cabled in the way described above. This method requires the imparting of a twist to the optical fibres about their corresponding axes, after they have been unwound from the reels. This twist is imparted by using a wheel mounted rotatably about the central reinforcing element and carrying the reels for unwinding the optical fibres. The wheel rotates simultaneously with the unwinding of the reels, producing a twist in the unwound optical fibres.

The Applicant has observed that the methods described above for reducing the birefringence of an optical fibre during the drawing process and for reducing the birefringence of a set of optical fibres during their cabling has the principal disadvantage that the actual twist which the optical fibre has at the end of the process is different from the theoretical torsion predicted on the basis of the applied torque. In practice, owing to phenomena of friction and the undesired application of non-negligible torques, the optical fibre has locally an actual angle of rotation different from the theoretically predicted angle, and therefore an actual twist different from the theoretically predicted twist. Moreover, the value of this actual twist cannot generally be determined with precision.

In the case of the drawing process, for example, if the twist is imparted after the application of the protective coating, the twist is retarded by the viscous friction which occurs within the coating device (because this viscous friction gives rise to a resistant torque opposing the applied torque). On the other hand, if the twist is imparted to the optical fibre before the application of the polymer protecting material. the optical fibre could be damaged, and its optical properties would therefore deteriorate.

In the patent EP 0842909, in which the torque is imparted to the optical fibre by the rotation of the coating device, the application of the torque takes place in the presence of viscosity (associated with the coating material), and therefore the amplitude of the rotation transmitted to the optical fibre is difficult to control.

A further cause of indeterminacy of the actual twist imparted to the optical fibre during the drawing process is related to the fact that, since the optical fibre is drawn downwards from a heated end of the preform (neckdown) and progressively cooled, the portion of optical fibre which extends from the preform to the twist device at each instant has a non-uniform consistency, owing to these temperature variations. In particular, the optical fibre is substantially consolidated at the twist device, while it is still partially molten at the lower end of the preform (neckdown). The application of a torque to the optical fibre at a point at which it is substantially consolidated (preferably, for the reason explained above, after the coating device) causes the partially viscous transmission of the twist to the less solid portions of fibre, as far as the neckdown. As a result of this, the fibre has, at the neckdown, an angle of rotation which is out of alignment with, and smaller than, the angle of rotation in the consolidated portion. This makes it more difficult to impart the desired twist to the optical fibre.

The Applicant has observed that the decrease in the amplitude of the rotation from the consolidated portion of fibre to the portion of fibre at the neckdown becomes greater as the frequency of the reciprocating motion increases. The Applicant has also noted that, when the methods described in the aforesaid U.S. Pat. Nos. 5,298,047, 5,418,881 and WO 9846536 are used, high frequencies of inversion of the rotation of the optical fibre may cause an undesired slip of the optical fibre with respect to the elements imparting the twist to it. The presence of this slip prevents the imparting of the desired torque to the optical fibre.

The twist actually imparted to an optical fibre in a drawing process is generally monitored by means of destructive tests. In particular, this twist monitoring is carried out by creating artificially a predetermined distribution of defects (for example air bubbles) within the optical fibre before the torque is imparted to it, and then, after the torque has been imparted, by analysing the optical fibre at a number of points under the microscope to check the arrangement of these defects. The actual twist "frozen" into the fibre can be derived from the arrangement of the defects. An operation of this type can advantageously be used before the start of the fibre production process, and requires the use of a portion of fibre which can be sacrificed. However, the Applicant considers that, since the process conditions and parameters are generally subject to variations (desired or undesired), the actual twist imparted during the process may prove to be different from that determined in this way, and its correct determination must be carried out on line during the production process.

Similar considerations are applicable to a process of cabling optical fibres in which the method of imparting a twist to the fibres is used to reduce the birefringence of the optical fibres. For example, the viscous effects present at the interface between the optical fibres and the thermoplastic material on which the fibres are typically deposited make it difficult to monitor the twist which is actually imparted. Further difficulties, according to the Applicant, arise from the fact that, with a method such as that described in the aforesaid patent application EP 646819A1, the actual twist imparted to the optical fibres depends on numerous process parameters, including the velocity of advance of the optical fibres in the direction of processing and the angular velocity of twist, and the undesired variations of any one of these parameters affects the value of the actual twist imparted to the optical fibre and therefore makes it different from the predicted value.

At the present time, the PMD of the different optical fibres in an optical cable can be determined precisely only after the cable itself has been completed, by measuring the PMD in a portion of the optical cable of suitable length.

Given the presence of a discrepancy between the twist which would be imparted to the optical fibre in the absence of disturbing effects (and that can be determined by theoretical calculations on the basis of the applied torque) and the actual twist which the fibre has at the end of the process in question, a method which enabled the actual twist to be determined on line in a simple and precise way would be of considerable use for the purpose of gaining a precise knowledge of the PMD of the fibre.

A technique for controlling the internal rotation of the principal axes of a birefringent optical fibre during the process of fabricating the fibre is proposed in the article "Technique for Controlling the Internal Rotation of Principal Axes in the Fabrication of Birefringent Fibers", C. G. Askins and M. J. Marrone, Journal of Lightwave Technology, Vol. 6, No 9, September 1988. This technique is based on a method for interpreting the optical power backscattered by a birefringent fibre illuminated laterally in such a way as to determine the internal orientation of the principal axes of birefringence. This technique consists in laterally illuminating the optical fibre with a He—Ne laser beam in such a way as to generate interference fringes by means of the backscattered light. A rotation of the optical fibre about its axis causes a shift of the fringes, owing to the ellipticity of the fibre or any anisotropy of the refractive index due to stresses. It is then possible to determine the rotation of the principal axes of birefringence of the optical fibre by measuring the shift of the fringes.

In the case of birefringent fibres (such as those considered in the cited article), rotations of the fibre cause a decrease of the birefringence and are therefore undesirable, by contrast with the situations considered above. The Applicant has observed that the technique proposed in the article by Askins and Marrone is suitable for the determination of relatively slow rotations of the optical fibre (of the order of 1 revolution/m) on line, and in fibre with high birefringence (with a beat length typically of the order of a few centimeters). According to the Applicant, this technique would not be suitable for the determination of the twist imparted to the optical fibre by one of the techniques described previously for reducing the birefringence, since these twists usually correspond to relatively high rotation velocities (of the order of 10 revolutions/m, for example), and the fibres in question are of the low-birefringence type.

A different technique for detecting the twist applied to a glass fiber is provided by JP 08245232. According to this patent, during the manufacturing of a glass fibre, the width of the glass fibre is measured in one direction using a fibre diameter-measuring device. Since the width of the glass fibre measured from the longitudinal direction changes depending on the direction of the measurement, the degree of twisting of the fibre can be found by examination of the changes in the measured value of the width of the glass fibre. In practice, as the fibre advances, a graph shows the variations of width as a function of the length of the fibre that has passed through a measuring line, and the angle of twist can be derived from this graph. As stated in the patent, this technique requires a maximum value of the width that is no less than 1.01 times the minimum value, in order to allow distinguishing the changes in the measured value of the width of the glass fibre due to twist from the changes imparted in the manufacturing process.

SUMMARY OF THE INVENTION

For the purposes of the present invention, the term low-birefringence optical fibre denotes an optical fibre with a beat length of at least 1 m.

With the present invention, the Applicant proposes a non-destructive technique for determining the actual twist imparted to an optical fibre, which can be used, for example, for measurement on line of the twist imparted to an optical fibre during a procedure for processing the fibre.

The Applicant has found that the actual twist can be determined on the basis of the measurement of the diameter of the optical fibre. This is because the Applicant has observed that, when the diameter of an optical fibre advancing in a predetermined direction and made to rotate about its axis is measured, the asymmetries and anisotropies of the optical fibre cause an oscillation of the measured value between a minimum and a maximum value, with a frequency which is correlated with the velocity of rotation of the fibre. The Applicant has found that, by suitably processing the results of the aforesaid diameter measurements, it is possible to obtain information indicating the actual twist imparted to the optical fibre. In particular, the Applicant has found that this information can be obtained by carrying out a Fourier transform of the time signal relative to the diameter measurement of the optical fibre and a subsequent analysis of the peaks of the corresponding power spectrum.

The Applicant has also found that this information can be used retroactively to carry out a monitoring on line of the twist imparted to the optical fibre, in such a way as to produce a fibre with an actual twist corresponding to that predicted according to specifications (the nominal twist) and therefore with a predetermined response in terms of PMD.

The technique according to the invention is applicable to a procedure for processing a low-birefringence optical fibre in which a twist which it is useful to measure is imparted to the optical fibre. This twist may be imparted, for example, in order to reduce the PMD of the optical fibre.

In a first aspect, the present invention relates to a method of measuring the twist imparted to an optical fibre, comprising the steps of:

advancing said optical fibre in a predetermined direction and at a predetermined velocity, imparting to said optical fibre, during said step of advancing, a twist about its axis; and measuring the diameter of said optical fibre during said step of advancing, to generate a signal indicating the diameter; and further comprising the step of processing said signal indicating the diameter to obtain a value indicating the twist imparted, said step of processing comprising the step of calculating a transform in the frequency domain of said signal.

Preferably, the said step of measuring the diameter comprises the generation of a fraction of the said signal comprising a set of diameter measurements, and the said step of processing the said signal indicating the diameter comprises the calculation of a transform in the frequency domain of the said fraction of the said signal.

The said step of calculating a transform in the frequency domain may comprise the application of the Fourier transform to the said fraction of the said signal.

The said step of processing preferably comprises the step of determining the power spectrum associated with the said transform in the frequency domain.

The said power spectrum has a set of peaks, and the said step of processing may comprise the derivation, from the said set of peaks of a subset of peaks correlated with the said imparted twist.

The said step of deriving the said subset of peaks may comprise the steps of comparing the power of each of the peaks of the said set with a predetermined threshold and eliminating contributions of the said spectrum having a power below the said threshold.

The said step of processing may comprise the step of measuring the maximum frequency associated with the said subset of peaks.

The said step of processing may comprise the step of dividing the value of the said maximum frequency by the value of the said velocity of advance to find the said value indicating the said imparted twist.

The said step of processing may comprise, before the measurement of the maximum frequency associated with the said subset of peaks executing a predetermined number of times said steps of measuring the diameter, calculating a transform in the frequency domain, and calculating the power spectrum in such a way as to obtain a predetermined number of power spectra, and may also comprise calculating, from the said power spectra, of an average power spectrum comprising the said subset of peaks.

The said step of processing may comprise the following steps, carried out after the said step of calculating the said average power spectrum:

determining the total number of peaks in the said average power spectrum and the number of peaks of the said subset of peaks;

comparing the number of peaks of the said subset with a predetermined percentage of the said total number of peaks;

and, if the said number of peaks of the said subset is smaller than the said predetermined percentage of the said total number of peaks, repeating the said steps of measuring the diameter, calculating a transform in the frequency domain, calculating the power spectrum and calculating the average power spectrum.

The said step of processing the said signal indicating the diameter may comprise the steps, carried out before the said step of calculating a transform in the frequency domain, of calculating the average value of the said values of diameter and of subtracting said average value from each of the said values of diameter.

The present invention also relates to a procedure for processing an optical fibre, comprising the steps of:

advancing said optical fibre in a direction of advance;

providing a twisting device along said direction of advance to interact with said optical fibre;

operating said twisting device according to at least one predetermined parameter corresponding to a nominal value of twist of said optical fibre;

producing, during said step of advancing, an actual twist in said optical fibre as a result of said operation of said twisting device;

measuring the diameter of said optical fibre to generate a signal indicating the diameter; and measuring said actual twist during said step of advancing, wherein said step of measuring said actual twist comprises calculating a transform in the frequency domain of said signal indicating the diameter.

The said step of measuring makes it possible to obtain an actual value of twist and the said procedure preferably comprises:

comparing the said actual value with the said nominal value; and controlling the operation of the said twisting device according to the result of the said step of comparing.

Advantageously the said step of controlling comprises one of the following steps, which are alternatives to each other:

keeping the operation of the said imparted twist device unchanged when the difference between the said actual value and the said nominal value is, in absolute terms, less than a predetermined quantity;

changing the operation of the said twisting device in a first direction such that the said actual twist is decreased, when the difference between the said actual value and the said nominal value is in absolute terms, greater than or equal to the said predetermined quantity and the said actual value is greater than the said nominal value; and changing the operation of the said twisting device in a second direction such that the said actual twist is increased, when the difference between the said actual value and the said nominal value is, in absolute terms, greater than or equal to the said predetermined quantity and the said actual value is less than the said nominal value.

The said procedure may comprise the further steps of:

heating a glass preform beyond its softening point;

drawing the said optical fibre from this preform in the said predetermined direction; and applying a protective coating to the said optical fibre.

Alternatively, the said step of advancing the said optical fibre may comprise the feeding of the said optical fibre to an extruder for the formation of an optical core of an optical cable, and the said procedure may comprise the further steps of:

feeding to the said extruder a supporting element adapted to define a central element of the said optical core;

feeding polymer material to the said extruder; and imparting to the said supporting element a twist about its axis, which causes the said twist of the said optical fibre.

The said optical fibre is preferably of the low birefringence type.

The said step of measuring the actual twist is preferably carried out according to the measurement method defined previously.

BRIEF DESCRIPTION OF THE DRAWING

The invention is described in detail below with reference to the attached figures, in which a non-restrictive example of application is shown. In particular.

DETAILED DESCRIPTION OF THE PREFERRED EMBODIMENTS

The technique according to the invention will be described initially with reference to a process of drawing an optical fibre.

Figure 1:
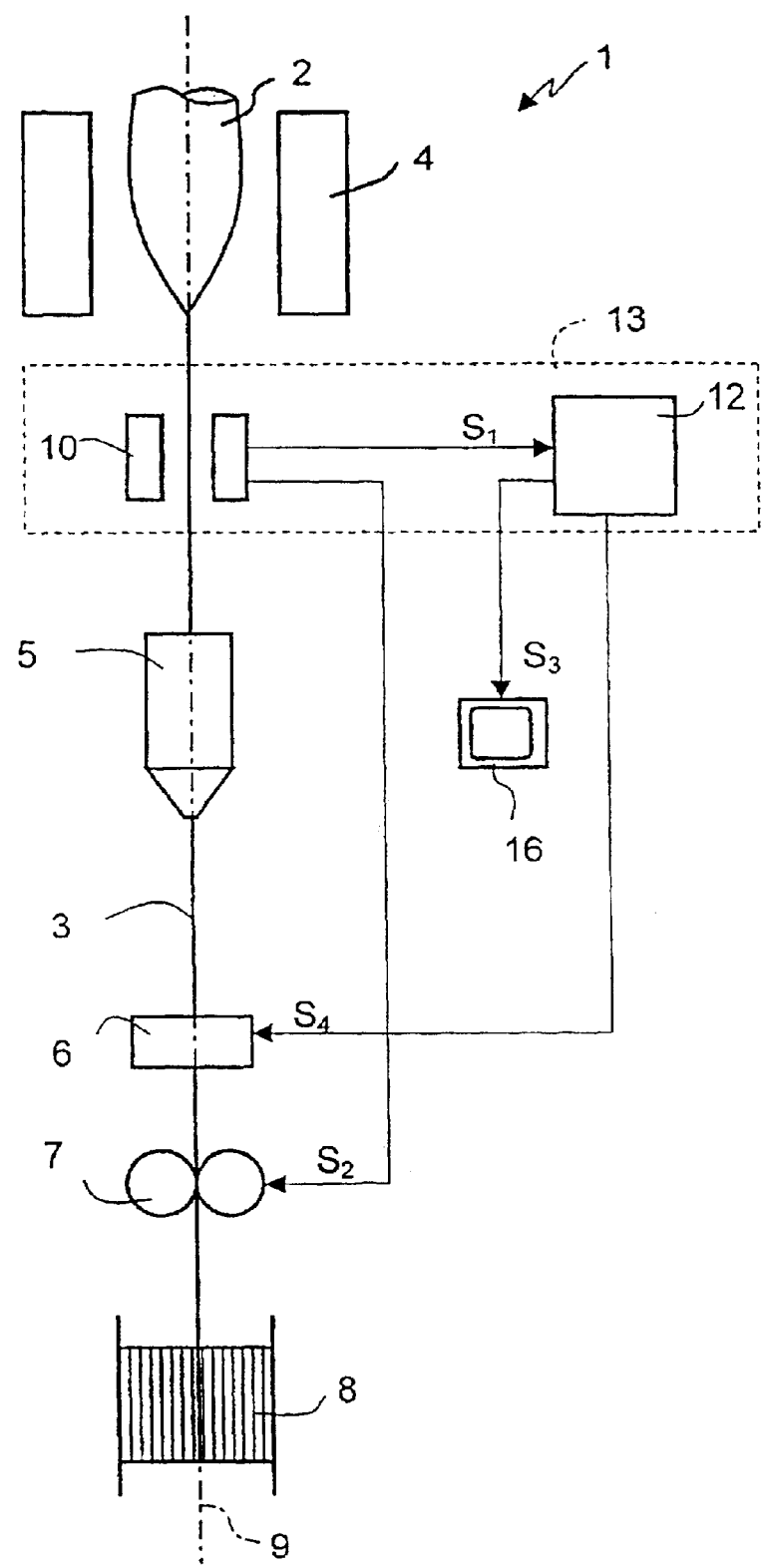
FIG. 1 shows a drawing tower in which a process of drawing using the method according to the present invention is carried out.

FIG. 1 shows schematically a drawing tower 1 for drawing an optical fibre 3 from a preform 2.

The tower 1 comprises a plurality of parts essentially aligned along a vertical drawing direction (hence the name "tower"). The choice of a vertical direction is based on the need to use the force of gravity to obtain, from the preform 2, a melt of fused material from which the fibre 3 can be drawn. In particular, the tower 1 comprises:

- a furnace 4 capable of heating the preform 2 to beyond its softening point; the furnace 4 may be of any type capable of producing the controlled softening of a preform, for example one of the type described in U.S. Pat. Nos. 4,969,941 and 5,114,338;
- a coating device 5 for the application of a protective coating to the optical fibre 3; the coating device 5 may be, for example, of the type described in U.S. Pat. No. 5,366,527;
- a pulling device 7 (for example of the single pulley or double pulley type) capable of pulling the optical fibre 3 downwards at a predetermined velocity $v_f$ (corresponding to the drawing velocity); and
- a take-up spool 8 on which the optical fibre 3 is wound at the end of the drawing process.

The tower 1 may also comprise a diameter monitor, located between the furnace 4 and the coating device 5, and capable of measuring the diameter of the optical fibre 3 during its passage, before the application of the protective coating. The signal generated by the sensor may, for example, be used to control the velocity of the pulling device 7 in such a way as to obtain an optical fibre 3 of predetermined diameter.

The tower 1 also comprises a twisting device 6, positioned between the coating device 5 and the drive device 7, to impart a predetermined twist to the optical fibre 3. The twisting device 6 is provided with at least one moving member capable of interacting with the optical fibre 3.

For the purposes of the present invention, the term "twist" denotes the ratio (disregarding a constant multiplication factor) between the angular velocity of rotation $d\theta/dt$ of the optical fibre (where $\theta$ is the angle of rotation of the optical fibre measured with respect to a fixed reference point) and the velocity of drawing $v_f$. The twist defined in this way can be measured in revolutions/m.

As described below, this predetermined twist is selected in such a way as to generate exchanges of power between the fundamental propagation modes in the optical fiber, such that the effects of the imperfections and irregularities of the fibre are rendered uniform in a length of the fibre equal to at least the beat length. Thus it is possible to reduce significantly the negative effects caused by the asymmetric stress conditions and by the imperfections of shape intrinsically present in the fibre.

The twisting device 6 may, for example, be of the type described in the previously cited patent application WO 9846536 in the name of Corning. In particular, the device 6 may include a pair of rollers (not illustrated) having surfaces interacting with the optical fibre and each having its axis perpendicular to the drawing axis 9, in which at least one roller is moved in a reciprocating way along its own axis, in such a way as to impart an alternating twist to the optical fibre 3. In particular, the twisting device 6 is capable of imparting to the optical fibre 3 an alternating twist with a predetermined inversion frequency $v$.

The tower 1 also comprises equipment 13 for carrying out, according to the present invention, the measurement and control on line of the twist applied to the optical fibre 3 by the twisting device 6. The equipment 13 is used to measure the actual twist, indicated in the following text by $T_{eff}$, imparted to the optical fibre, this actual twist will typically be different from the predetermined twist, indicated in the following text by T, owing to the presence of frictional forces or other undesired effects.

For convenience of description, without abandoning the general application, it will be assumed in the following text that the twist imparted to the optical fibre 3 by the twisting device 6 varies according to a sinusoidal law. In practice, it will be assumed that the optical fibre 3 has, as a result of the action of the device 6, an actual angle of rotation $\theta_{eff}$ (measured with respect to a fixed reference point) expressed by the relation $\theta_{eff}=\theta_{max,eff}\cdot\sin(2\pi vt)$, where $\theta_{max,eff}$ is the maximum actual angle of rotation and $v$ is the frequency of inversion of the rotation, and that the optical fibre therefore undergoes an actual twist $T_{eff}$ expressed by the relation $T_{eff}=T_{max,eff}\cdot\cos(2\pi vt)$, where $T_{max,eff}=2\pi v\cdot\theta_{max,eff}$ is the maximum actual twist.

The equipment 13 comprises a diameter monitor 10 and a processing unit 12 capable of processing the signal generated by the monitor 10.

The diameter monitor 10 comprises an optical sensor, for example of the interferometric type, located on the axis 9 between the furnace 4 and the coating device 5, and has its output connected to the processing unit 12 and to the pulling device 7. The diameter monitor 10 is capable of generating a first electrical signal $S_1$ indicating the diameter of the optical fibre 3 to be sent to the processing unit 12 and a second electrical signal $S_2$ for regulating the pulling velocity to be sent to the pulling device 7.

An example of a diameter monitor for the application in question is provided in U.S. Pat. No. 4,280,827, in which an electrical signal is generated by an array of photodiodes receiving the interference fringes obtained by directing a laser beam on to the optical fibre. This signal is sent to comparator means which generate a number of electrical pulses correlated with the fringe pattern. Subsequently, means of counting the pulses supply, according to the number of pulses detected, a signal indicating the diameter of the optical fibre.

An alternative technique for optically measuring the diameter of an optical fibre during the process of its fabrication is provided by U.S. Pat. No. 5,661,553 and comprises the steps of transversely illuminating a portion of optical fibre with a light beam, measuring the amplitude of the shadow produced by the portion of optical fibre in a predetermined angular sector about the optical fibre, and determining, from this measurement, the variations of diameter during the process.

The processing unit 12 has its output connected to the twisting device 6 and to a display unit 16. The display unit 16 is designed to present information (for example the measurement data) to an operator.

The processing unit 12 is capable of receiving the first signal $S_1$ from the diameter monitor 10, storing this signal and processing it to generate, as described below, a third signal $S_3$ to be sent to the display unit 16 and a fourth signal $S_4$ to be sent to the twisting device 6. The contents of the signals $S_3$ and $S_4$ will be described subsequently.

Figure 2:
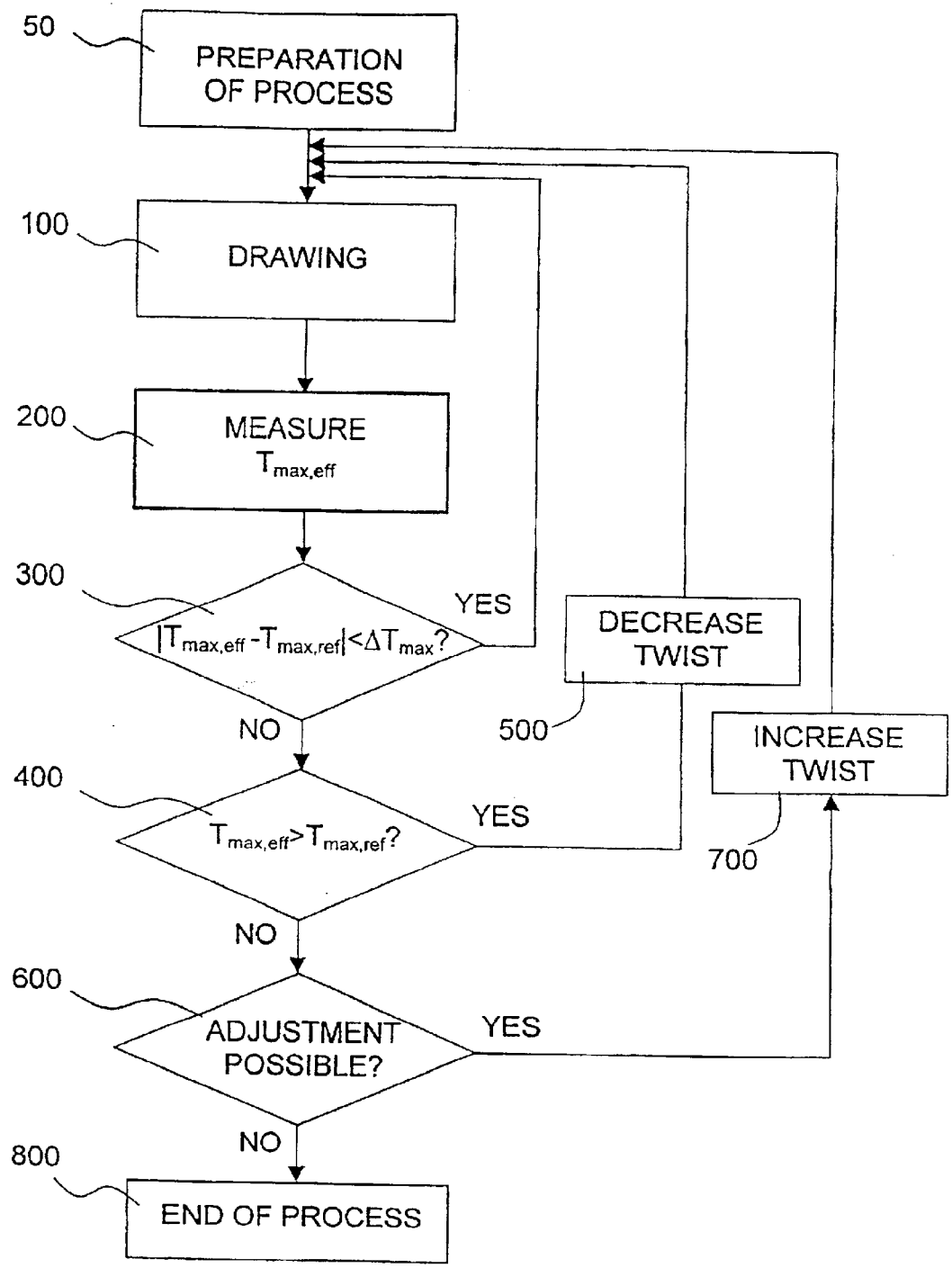
FIG. 2 shows a flow chart relating to some steps of the aforesaid drawing process.

The drawing process is described below with reference to the flow charts in FIGS. 2 and 3.

In a preliminary step of the drawing process (block 50), certain process parameters are set in the processing unit 12, including:

the drawing velocity $v_f$ which has to be set by the pulling device 7;

an initial value $v_0$ of the frequency $v$ of inversion of the direction of rotation of the optical fibre 3 during the twisting;

an initial value of the maximum excursion of the moving member of the twisting device 6 in its movement which produces the twist of the optical fibre; for example, if this moving member comprises a pair of rollers of which at least one can be moved along its axis, this value corresponds to the maximum longitudinal relative displacement between the two rollers, starting from an equilibrium position; the maximum excursion of the moving member of the twisting device 6 determines the value $\theta_{max,eff}$ of the actual maximum angle of rotation of the optical fibre 3;

a nominal value, hereafter called the reference value and indicated by $T_{max,ref}$ in the following text, for the maximum twist $T_{max}$ which is to be imparted to the optical fibre 3 by the twisting device 4 (for example in order to have a desired value of PMD); and other parameters, $\Delta T_{max}$, $\Delta t$, N, $N_s^*$, $N_s^{**}$, whose significance is explained below.

The drawing velocity $v_f$ is usually selected according to the characteristics of the different parts of the draw tower 1 and, together with the temperature in the furnace 4, determines the diameter of the optical fibre 3. Typical values of $v_f$ in the case of a single-mode fibre are in the range from 5 m/s to 20 m/s.

The value $T_{max,ref}$ represents the maximum actual twist which is to be imparted to the optical fibre in such a way as to obtain the birefringence characteristics required by the specifications. The value $T_{max,ref}$ is selected according to the drawing velocity $v_f$ in such a way that, for a portion of optical fibre 3 having a length equal to a beat length, the irregularities present in the optical fibre 3 are distributed in an essentially uniform way about tile axis of the fibre. Thus, during the transmission of the signals, the energy is remixed between the component modes of the fundamental mode. The Applicant has observed that, to achieve this object, it is advantageous to impart to the optical fibre, where the usual drawing velocities of an optical fibre are concerned, a torque such that a maximum twist $T_{max}$ in the range from 1 to 15 revolutions per meter is induced. This is because, with the usual drawing velocities of an optical fibre, this torque enables the spatial period of variation of the direction of rotation of the fibre to be in the range from 1 to 100 meters, which is comparable with the usual beat lengths of optical fibres.

The initial value $v_0$ of the inversion frequency $v$ is selected according to the reference value $T_{max,ref}$ and the drawing velocity $v_f$, and is preferably within the range from 1 Hz to 15 Hz for a drawing velocity $v_f$ in the range from 5 m/s to 20 m/s.

Still in the preliminary step (block 50), the tower 1 is prepared for drawing by placing the preform 2 inside the furnace 4, which has previously been heated to a temperature higher than the softening point. In the furnace 4, an end portion (neckdown) of the preform 2 is melted, with consequent generation of a drop of melted material. This drop is elongated downwards under the action of the force of gravity, drawing with it additional melted material in such a way as to form a threadlike element of molten material which is cooled (and therefore consolidated) progressively. This threadlike element is made to pass through the diameter monitor 10, the coating device 5, the twisting device 6 and the pulling device 7, and a few turns of it are wound on to the take-up spool 8.

On completion of the preliminary step, the drawing process begins (block 100), preferably without a break between it and the preliminary step, with the activation of the pulling device 7 and the coating device 5. The pulling device 7 pulls the optical fibre 3 downwards at a velocity $v_f$, causing its continuous formation from the neckdown, while the coating device 5 applies the protective coating to the optical fibre 3 which passes through it. At the same time, the twisting device 6 is moved with an inversion frequency of $v_0$ and a maximum excursion of its moving member equal to the predetermined value, in such a way as to provide, according to theoretical predictions, an alternate twist of the optical fibre 3 having a maximum value of $T_{max,ref}$. The initial value of the inversion frequency $v_0$ and the initial value of the maximum excursion of the moving member of the twisting device 6 are communicated to the twisting device 6 by the processing unit 12 by means of the fourth signal $S_4$.

After passing through the pulling device 7, the optical fibre 3 is wound oil to the take-up spool 8.

According to the present invention, the actual twist $T_{eff}$ imparted to the optical fibre 3 is measured on line (block 200) during the drawing of the optical fibre 3. This measurement, described in detail below with reference to the flow chart in FIG. 3, is made by using the values of diameter measured by the diameter monitor 10 and is completed with the determination of the maximum actual twist $T_{max,eff}$ imparted to the optical fibre 3. Given the law of variation of the twist (a sinusoidal law in this specific case), the actual twist $T_{eff}$ can be derived from the value $T_{max,eff}$. By means of the third signal $S_3$, the processing unit 12 sends the information on the determined maximum actual twist $T_{max,eff}$ to the visual display unit 16, in such a way that this information is communicated to the operator.

Also according to the invention, the result of this measurement can be used to retroactively control the actual twist imparted to the optical fibre 3, particularly by adjusting the value of the inversion frequency $v$. In detail, the processing unit 12 compares the determined maximum actual twist $T_{max,eff}$ with the preset maximum reference twist $T_{max,ref}$; in particular, the unit 12 checks whether the difference between $T_{max,eff}$ and $T_{max,ref}$ is, in absolute terms, less than a preset quantity $\Delta T_{max}$ (block 300).

If this difference is, in absolute terms, less than the preset quantity $\Delta T_{max}$ (YES output of block 300), it is not necessary to vary the actual twist. Consequently the drawing of the fibre continues without modifications (block 100) and the steps of measuring the maximum actual twist $T_{max,eff}$ (block 200) and comparing it with $T_{max,ref}$ (block 300) are repeated.

However, if this difference, in absolute terms, is greater than or equal to the value $\Delta T_{max}$ (NO output of block 300), then the processing unit 12 makes a further check (block 400) to determine the sign of the difference $T_{max,eff}-T_{max,ref}$, in such a way as to establish the sign of the variation of the inversion frequency ν which must be imparted to the twisting device 6. In particular, a check is made as to whether $T_{max,eff} > T_{max,ref}$.

If $T_{max,eff}$ is greater than $T_{max,ref}$ (YES output of block 400), the processing unit 12 generates and sends to the twisting device 6, by means of the fourth signal $S_4$, the command to decrease the inversion frequency ν, in such a way that the maximum actual twist $T_{max,eff}$ is decreased (block 500). The process continues with the drawing of the optical fibre (block 100) in the new conditions and with the repetition of the steps of measuring the maximum actual twist $T_{max,eff}$ (block 200), determining the absolute value of the difference $T_{max,eff}-T_{max,ref}$ (block 300) and determining the sign of the difference $T_{max,eff}-T_{max,ref}$ (block 400).

If $T_{max,eff}$ is less than $T_{max,ref}$ (NO output of block 400), the processing unit 12 makes a further check (block 600) to determine whether the twisting device 6 is capable of increasing the inversion frequency ν beyond the current value. In particular, the processing unit 12 determines whether the electric motor of the twisting device 6 has reached its operating limit. If this operating limit has not been reached, and therefore if ν can be increased further (YES output of block 600), the processing unit 12 sends to the twisting device 6, by means of the fourth signal $S_4$, the command to increase the inversion frequency ν in such a way as to increase the maximum actual twist $T_{max,eff}$ (block 700). The process continues with the drawing of the fibre (block 50) in the new conditions and with the repetition of the steps of measuring the maximum actual twist $T_{max,eff}$ (block 200), determining the absolute value of the difference $T_{max,eff}-T_{max,ref}$ (block 300), determining the sign of the difference $T_{max,eff}-T_{max,ref}$ (block 400), and determining whether the operating limit has been reached by the twisting device 6 (block 600).

If the operating limit of the twisting device 6 has been reached, in other words if ν cannot be increased further (NO output of block 600), the processing unit 12 sends an alarm signal to the display unit 16 by means of the third signal $S_3$ (block 800). After this signal has been given, the operator can interrupt the process.

If there are no interruptions for the process for the reason described above, the drawing process can be interrupted after a predetermined time or when predetermined conditions are attained, for example after a portion of preform of predetermined length has been processed.

According to the type of twisting device used variations of the maximum excursion of the moving member of the twisting device 6 may also be introduced as an alternative or in addition to the variations of the inversion frequency ν, in order to obtain the desired variations of the maximum actual twist $T_{max,eff}$.

According to an alternative solution to that relating to the steps 300–700, the imparted twist can be controlled simply by comparing $T_{max,eff}$ with $T_{max,ref}$ and causing an increase in the imparted twist when the difference between $T_{max,eff}$ and $T_{max,ref}$ is less than a predetermined quantity (which may be equal to zero) and a decrease in the imparted twist when the difference between $T_{max,eff}$ and $T_{max,eff}$ is greater than a predetermined quantity (which may be equal to zero).

Figure 3:
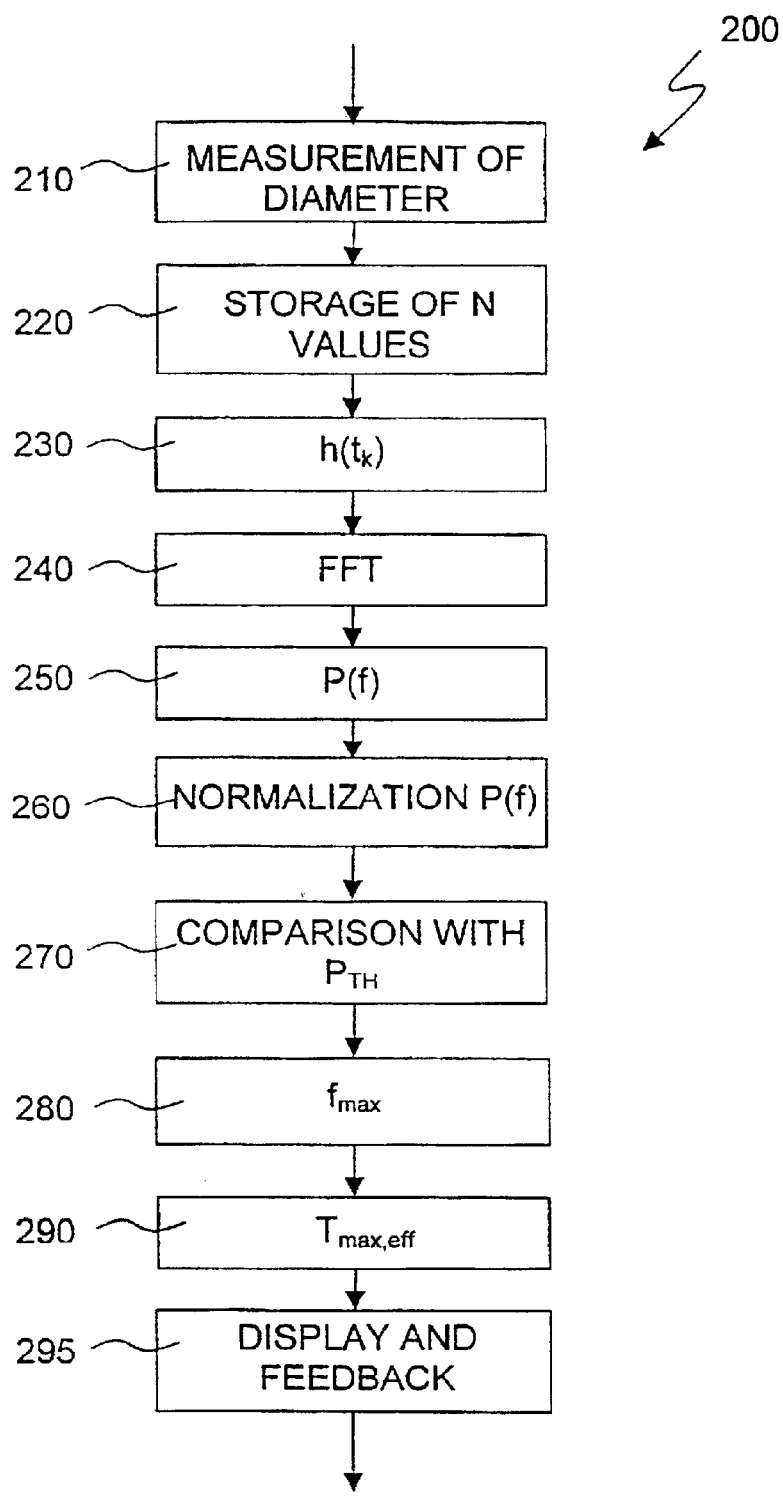
FIG. 3 shows a flow chart relating to further step of the drawing process.

FIG. 3 shows a flow chart of the different steps of the method of measuring the maximum actual twist $T_{max,eff}$ on line according to the invention. This method comprises, as mentioned above, the analysis of the measured values of diameter, for the purpose of finding the value of the maximum actual twist $T_{max,eff}$.

In detail, the diameter monitor 10 makes a periodic measurement of the diameter of the fibre (block 210) during the passage of the optical fibre 3. The diameter monitor 10 operates at a predetermined measurement frequency, preferably higher than 500 Hz; this value corresponds to a time interval $\Delta t$ of less than 2 ms between one measurement and the next. The value $\Delta t$ is one of the parameters set in the preliminary step of the process.

The diameter monitor 10 sends the sequence of the measured values of diameter, temporally spaced by $\Delta t$, by means of the first signal $S_1$ to the processing unit 12. Additionally, the diameter monitor 10 carries out, by means of the second signal $S_2$, a continuous adjustment of the drawing velocity $v_f$ set by the pulling device 7, in such a way as to minimize the difference between the measured diameter and a value of diameter stipulated by the specifications.

After receiving the first signal $S_1$, the processing unit 12 stores the values indicating the diameter (block 220) until a set of N values $[d_1, \ldots, d_N]$ is accumulated, these values being detected at instants of time $t_1, \ldots, t_N$ measured from the start of the measurements of the set in question. The fraction of signal $S_1$ comprising this set of N values has a duration of $(N-1)\cdot \Delta t$.

The value of N is one of the parameters set in the preliminary step of the process and is selected according to the characteristics of the diameter monitor 10 used (particularly those of the minimum possible value of $\Delta t$) and according to the initial value $v_0$ of the inversion frequency ν. In particular, the value of N is selected according to the requirements of signal analysis which will be made clear in the rest of the description.

The processing unit 12, having stored the set of N values $[d_1, \ldots d_N]$, calculates the average value $d_{ave}$ of these values and carries out a normalization of the set $[d_1, \ldots, d_N]$ by subtracting the average value $d_{ave}$ from each value (block 230). Thus a time-based function $h(t_k)$ is obtained, defined as:

$$h(t_k) = d_k - d_{ave} \quad (1)$$

where k is an integer in the range from 1 to N.

The processing unit 12 then carries out the Fourier transform at discrete frequencies DFT (Discrete Fourier Transform) of the function $h(t_k)$ (block 240). The DFT transform is calculated for the set of frequencies $f_n = n \cdot f_1 = n/(N \cdot \Delta t) = n/t_N$, where n is an integer which varies from $-N/2$ to $+N/2$, yielding the following function $H(f_n)$:

$$H(f_n) = H_n = \Delta t \sum_{k=0}^{N-1} h_k e^{\left(\frac{2\pi i k n}{N}\right)} \quad (2)$$

Since it is not possible to measure repeated events having a periodicity greater than the duration of the measurement $t_N$, the frequency $f_1 = 1/t_N = 1/(N \cdot \Delta t)$ represents the minimum frequency (of repetition of an event) which can be measured.

The Applicant has found that the fast Fourier transform (FFT) can be used advantageously as an alternative to the discrete Fourier transform (DFT) for the application of the method according to the invention. In the case of the fast Fourier transform, the transform calculation algorithm is particularly fast because values of N equal to powers of 2 are used.

In tile calculation of the DFT, the value of N is preferably selected in such a way that there is a high measurement resolution, particularly in such a way that there is a minimum measurable frequency $f_1$ much lower than the initial value $v_0$ of the inversion frequency. The value of N is then selected in such a way as to satisfy the following relation:

$$N \gg \frac{1}{\Delta t \cdot v_0} \quad (3)$$

Then, using the function $H(f_n)$ calculated previously, the processing unit 12 calculates the power spectrum P(f) of the signal $h(t_k)$ at the positive frequencies $f_{|n|}=|n|/(N \cdot \Delta t)$ only (block 250), where $|n|=0, 1, \ldots, N/2$, giving:

$$\begin{cases} P(f_0) = \frac{1}{N}|H_0|^2 \\ P(f_{|n|}) = \frac{1}{N}(|H_{|n|}|^2 + |H_{|N-n|}|^2) \text{ for } |n| = 1, 2, \ldots, \frac{N}{2}-1 \\ P(f_{\frac{N}{2}}) = \frac{1}{N}|H_{\frac{N}{2}}|^2 \end{cases} \quad (4)$$

The discrete power spectrum P(f) is therefore calculated for N/2 points on the frequency axis, spaced equally by a quantity equal to $f_1$. The value $f_1$ therefore represents the resolution of the spectrum P(f).

The Applicant has observed that the power spectrum P(f) has a set of peaks spaced equally by a quantity equal to 2v. The factor 2 is a consequence of the fact that, in a period of rotation (in other words a revolution of 360°), the measured diameter has two maximum values and two minimum values, and therefore the maximum values (peaks) are measured at a frequency which is twice the inversion frequency v. The Applicant has also observed that the spectrum P(f) may also contain peaks spaced equally by v, due to vibrations of the optical fibre at this frequency caused by the twisting device 6.

In order to reduce the undesirable transfer of power ("aliasing") usually present between adjacent frequencies in the power spectrum P(f), a special mathematical algorithm known as the "Hanning window" can be applied if necessary to the value $h(t_k)$ before the calculation of the Fourier transform. This algorithm provides for the multiplication of the values $h(t_k)$ by the term $$\frac{1}{2}\left[1 - \cos\left(\frac{2\pi k}{N-1}\right)\right].$$

The Applicant has observed that the heights of the peaks of the spectrum P(f) depend on the size of the asymmetries and anisotropies of the optical fibre 3. In order to reduce this dependence, the processing unit 12 executes a normalization of the spectrum (block 260) with respect to the highest peak after the calculation of the power spectrum P(f).

Moreover, the peaks of the power spectrum are compared with a preset power threshold $P_{TH}$ (selected according to the type of diameter monitor used, in such a way that the power of the noise is generally lower than the threshold), in order to eliminate contributions of the spectrum having a power below this threshold, and, consequently, to eliminate the noise in order to derive a subset of useful peaks (block 270).

The processing unit 12 then identifies, among the peaks above the threshold $P_{TH}$, the peak having the maximum frequency $f_{max}$ (block 280). The Applicant has found that this maximum frequency $f_{max}$ is related to the inversion frequency v and to the maximum actual angle of rotation $\theta_{max,eff}$ imparted to the optical fibre 3 in the following way:

$$f_{max} = 2 \cdot v \cdot \theta_{max,eff} \quad (5)$$

In a following step, the processing unit 12 finds, from the value of the maximum frequency $f_{max}$, the maximum actual twist $T_{max,eff}$ imparted to the optical fibre 3 (block 290), using the following formula (which can be derived as described below):

$$T_{max,eff} = \frac{f_{max}}{2 \cdot v_f} [\text{revolutions/m}] \quad (6)$$

For the purposes of the analysis of the process, it may also be useful to calculate the average actual twist $T_{ave,eff}$ imparted to the optical fibre 3. It can be demonstrated that the average actual twist $T_{ave,eff}$ can be determined by a formula similar to (6):

$$T_{ave,eff} = \frac{f_{ave}}{2 \cdot v_f} [\text{revolutions/m}] \quad (7)$$

where $f_{ave}$ is the average frequency of the set of peaks above the threshold $P_{TH}$, provided by the following relation:

$$f_{ave} = \frac{\sum_{2v \le f_k \le f_{max}} P(f_k) f_k}{\sum_{2v \le f_k \le f_{max}} P(f_k)} \quad (8)$$

The relation (6) can be derived as follows.

Assuming (as has been done up to this point) an angle of rotation θ variable in time according to a sinusoidal law (such as that which could be obtained, for example, by using a twisting device such as that described in patent application WO 9846536 in the name of Corning), in other words one describable by a function of the type $\theta = \theta_{max} \cdot \sin(2\pi v t)$, the (theoretical) twist T imparted to the optical fibre 3 is, as stated above, equal (given a constant multiplication factor of ½π) to:

$$T = \frac{1}{v_f} \cdot \frac{\partial \theta}{\partial t} \cdot \frac{1}{2\pi} = \frac{v \cdot \theta_{max}}{v_f} \cos(2\pi v t) [\text{revolutions/m}] \quad (9)$$

The maximum twist $T_{max}$ applied to the optical fibre 3 is therefore found to be equal to:

$$T_{max} = \frac{v \cdot \theta_{max}}{v_f} \quad (10)$$

In the real case, a maximum actual twist $T_{max,eff}$, which, for the aforesaid reasons of resistance (particularly viscous resistance) to twist, is smaller than the maximum theoretical twist $T_{max}$, is imparted to the optical fibre 3.

In particular, since the maximum angle of rotation $\theta_{max}$ is the only one of the parameters on which $T_{max,eff}$ depends (v, $\theta_{max}$, $v_f$) which is significantly affected by the aforesaid effects of resistance to twist, the aforesaid difference between the actual and theoretical values of the maximum twist is essentially attributable to the variations of this parameter. It can therefore be considered that there is a maximum actual angle of rotation $\theta_{max,eff}$ which is smaller than the maximum theoretical angle of rotation $\theta_{max}$ and that $T_{max,eff}$ can be expressed thus:

$$T_{\max,e\!f\!f} = \frac{v \cdot \theta_{\max,e\!f\!f}}{v_f} \qquad (11)$$

Since both the frequency of inversion of the rotation v and the drawing velocity $v_f$ are known (having been set by the operator), the maximum actual twist $T_{max,eff}$ can be found after the maximum actual angle of rotation $\theta_{max,eff}$ has been determined. Since, according to equation (5), $v \cdot \theta_{max,eff}$ is equal to $f_{max}/2$, the desired expression (6) is found.

After the maximum actual twist $T_{max,eff}$ has been found, the processing unit 12 stores this value and sends it to the display unit 16 by means of the third signal $S_3$ to display the results (block 295).

Figure 4:
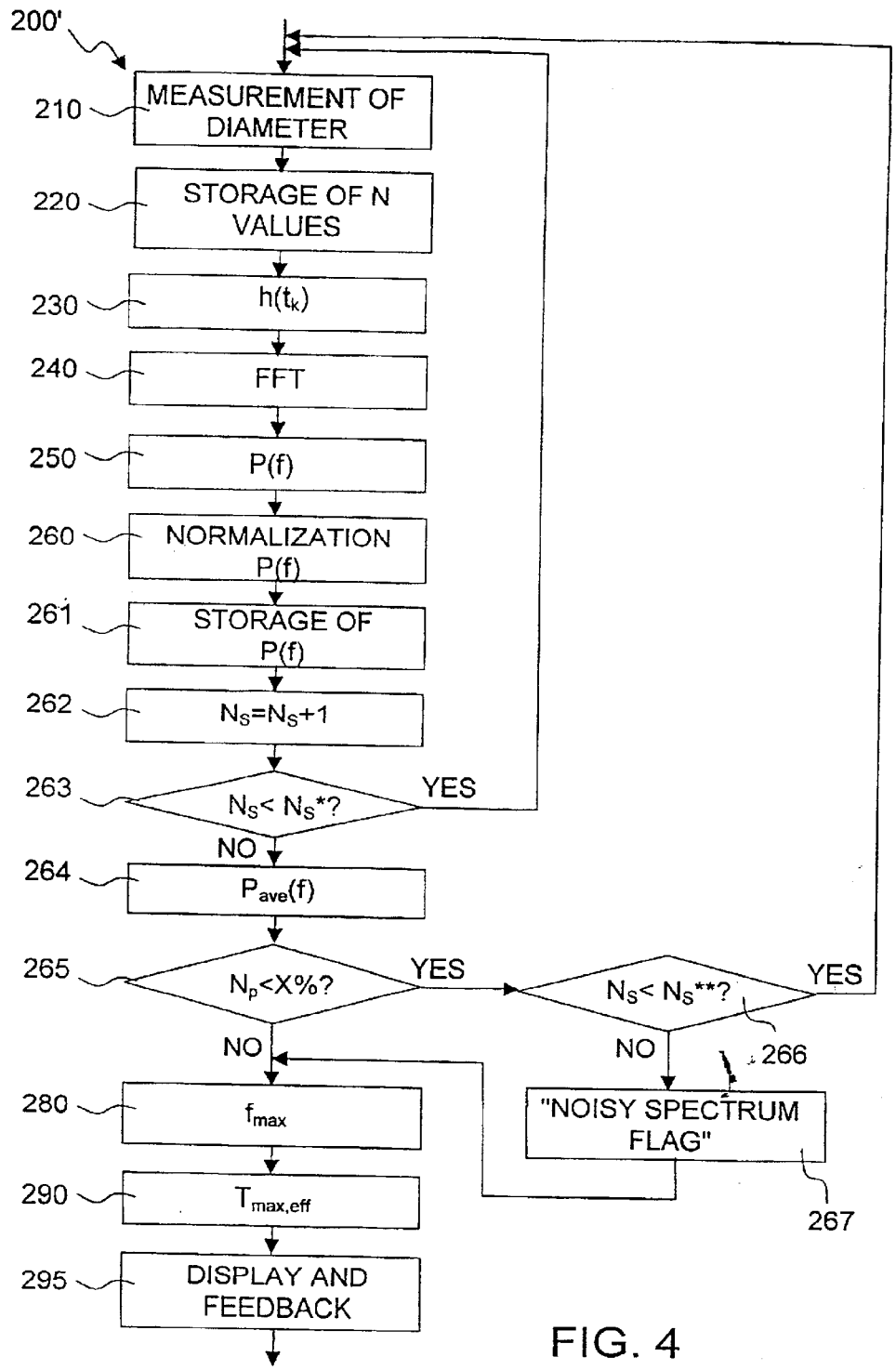
FIG. 4 shows a flow chart comprising steps which are alternatives to those of the flow chart in FIG. 3.

As stated above with respect to the flow chart in FIG. 4, the measured values of twist can be used to carry out an on line control ("feedback") of the actual twist imparted to the optical fibre 3 by the twisting device 6 (blocks 300–700).

The previously described steps of the method of measuring the actual twist imparted to the optical fibre can be repeated for successive sets of N measured values of diameter. In particular, these steps can be repeated periodically, if necessary without a break between one repetition and the next.

With reference to the flow chart in FIG. 4, an alternative method of measuring the twist imparted to the optical fibre 3 will now be described. The set of steps of this alternative method is indicated by 200'. This method differs from the previously described method only in the steps following the step of calculation of the power spectrum P(f) and its normalization (blocks 250 and 260 in FIG. 3). The steps preceding the calculation of the power spectrum P(f), in other words the steps of measuring the diameter N times (block 210), storing the N values found (block 220), calculating the function $h(t_k)$ (block 230), calculating the Fourier transform FFT (block 240), calculating the power spectrum P(f) and normalizing the power spectrum P(f) with respect to the highest peak (block 260), are similar to those described previously and are represented in the flow chart of FIG. 4 by the same reference numbers as those of the corresponding steps of FIG. 3.

According to this alternative method, after the normalization of the spectrum P(f), the latter is stored (block 261) and the processing unit 12 increases by one unit the value N, of a counter of the number of stored spectra (block 262); in practice, $N_s=N_s+1$. After the counter of the number of stored spectra has been updated, the processing unit 12 executes a check (block 263) to determine whether the number of stored spectra N, is smaller than a preset value $N_s^*$. If this condition is true (YES output of block 263), the processing unit 12 repeats the operations required to acquire and store a further spectrum P(f) (blocks 210–261), updates the counter of the number of stored spectra again (block 262), and repeats the determination on the number of spectra (block 263).

If the number of stored spectra N, reaches a value for which the aforesaid condition ($N_s<N_s^*$) is no longer true (NO output of the block 263), in other words if the number of stored spectra is equal to $N_s^*$, the processing unit 12 calculates the average power of the stored spectra (block 264), thus obtaining an average power spectrum $P_{ave}(f)$. This operation is executed for the reason stated below.

Each power spectrum P(f) has a large number of peaks. This is because, as stated previously, in addition to the peaks spaced apart by a quantity equal to twice the inversion frequency (referred to below as signal peaks), there are numerous undesired peaks (which represent a kind of noise), due for example to vibrations and oscillations of the optical fibre. The signal peaks therefore represent a subset of the total set of peaks. If the number of these undesired peaks is high, the noise associated with them may make the useful peaks unrecognizable. The Applicant has observed that the average of a plurality of spectra acquired in a time interval in which the frequency of inversion of the rotation is essentially constant has a number of undesired peaks (and, therefore, a quantity of noise) which is much smaller than the individual spectra.

The processing unit 12 therefore carries out a check of the quality of the resulting average spectrum (block 265). This check consists in the comparison of the total number of peaks $N_{p,t}$ with the number of signal peaks $N_p$ (correlated with the inversion frequency and therefore with the twist) present in the resulting average spectrum.

To find the total number of peaks $N_{p,t}$ it is possible to use power spectrum processing algorithms which are known in the art. For example, it is possible to find the total number of peaks $N_{p,t}$ by executing the following operations for each point of the axis of the frequencies in which the average power spectrum $P_{ave}(f)$ has been calculated:

- calculating the average value of the powers corresponding to the point itself, to the three preceding points and to the three following points;
- calculating the ratio between the power value at the point in question and the calculated average value;
- comparing this ratio with a predetermined value (for example 2); and
- incrementing by one unit a counter of the total peaks when this ratio is greater than the predetermined value.

Among all the peaks of the average power spectrum $P_{ave}(f)$ which are found, the signal peaks can be recognized because they are spaced apart by a quantity equal to twice the inversion frequency.

If the number of signal peaks $N_p$ found in this way is greater than or equal to a predetermined percentage X % (for example 40%) of $N_{p,t}$ (NO output of block 265), we move, in a way similar to the method described previously, to the calculation of the maximum frequency $f_{max}$ (block 280) and to the calculation, storage and display of the maximum actual twist $T_{max,eff}$ (blocks 290, 295) according to the procedures described above with reference to the flow chart of FIG. 3.

However, if $N_p$ is smaller than X %·$N_{p,t}$ (YES output of block 265), the spectrum is considered to be "noisy", and therefore the processing unit 12 executes a further check (block 266) to determine whether the number $N_s$ of spectra stored and used to find the average is smaller than a preset value $N_s^{}$. If $N_s$ is smaller than $N_s^{}$ (YES output of block 266), the processing unit 12 proceeds with the acquisition of a new spectrum (blocks 210–265) in such a way as to increment the number of spectra to be averaged. If, after the incrementing by a further unit (block 262), it is still found that $N_p<X$ %·$N_{p,t}$ (YES output of block 265) and $N_s$ has reached the value $N_s^{}$ (NO output of block 266), this means that, in spite of the averaging operation carried out previously, the spectrum is still considered noisy, and the processing unit 12 sends, by means of the third signal $S_3$, a message (for example the "noisy spectrum flag" message) to be displayed on the display unit 16 (block 267**). The operator, having read this message, is informed that the measurement of the twist obtainable from this average determined spectrum is affected by a non-negligible error.

Following the sending of this message, the processing unit also carries out, on this average spectrum, the steps of calculating the frequency $f_{max}$ (block 280) and calculating, storing and displaying the maximum actual twist $T_{max,eff}$ (blocks 290. 295).

In addition to the application described with respect to a drawing process, the method according to the present invention can be applied to other processes in which it is necessary to measure and/or control the twist imparted to an optical fibre. For example, the measuring equipment 13 can be used advantageously to carry out on line measurement and/or control of the twist actually imparted to the optical fibres in a cabling process such as that described below, developed by the present Applicant.

Figure 7:
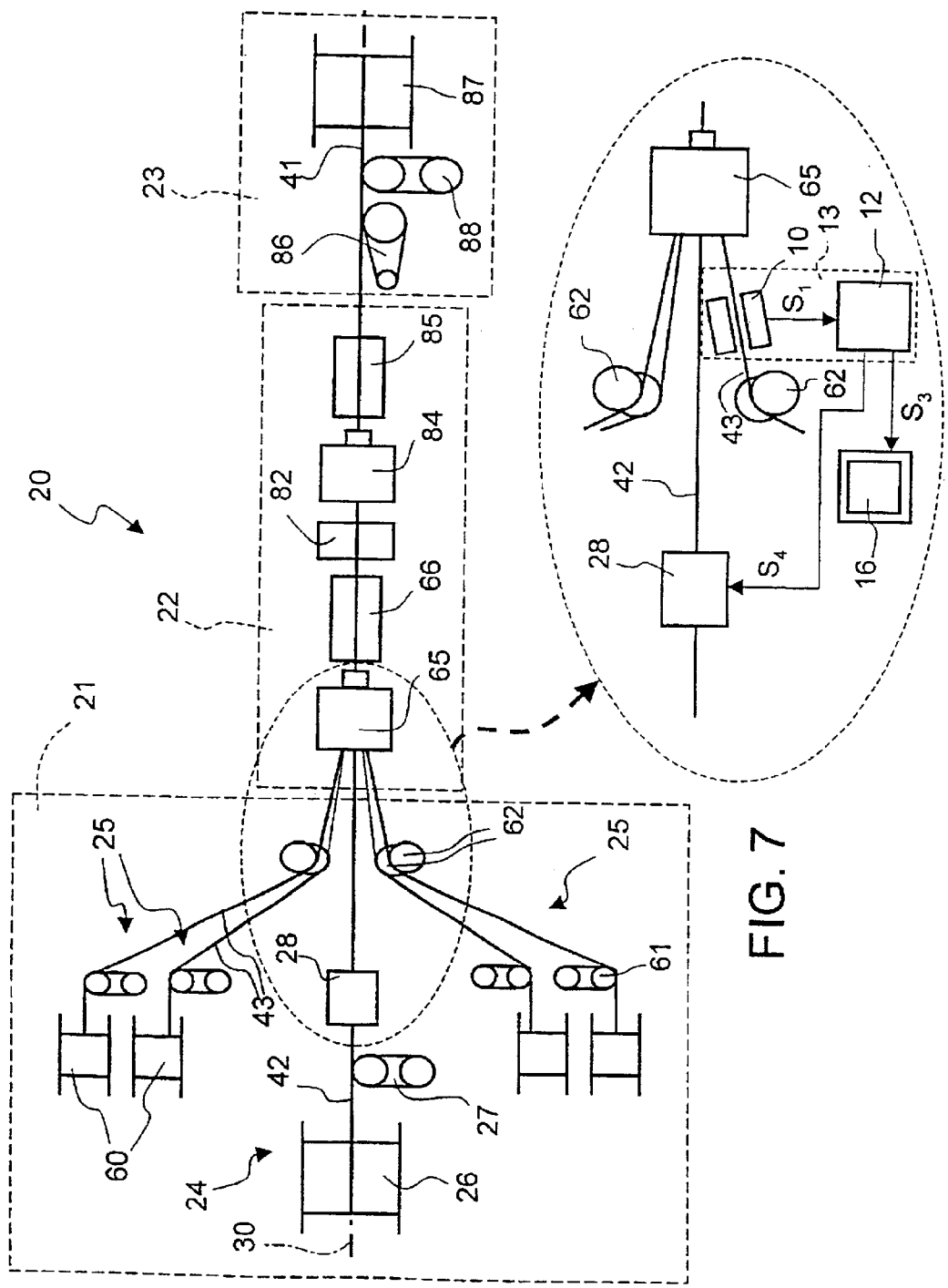
FIG. 7 shows an assembly for the production of an optical cable which uses the technique according to the present invention.

With reference to FIG. 7, the number 20 indicates, as a whole, an assembly for the fabrication of an optical core 41. The assembly 20 comprises, in its essential parts, an unwinding and feed section 21, an extrusion section 22 and a take-up section 23, which follow each other in an essentially rectilinear direction of processing 30.

The feed section 21 comprises a unit 24 for feeding a central element 42 (having the function of an internal support of the cable) to the extrusion section 22 and a plurality of units 25 for feeding optical fibres 43 to the extrusion section 22.

The unit 24 comprises a reel 26 for unwinding the central element 42, a storage device 27 for regulating the tension of the unwinding of the central element 42, and a twisting device 28, located along the direction of processing 30 and capable of imparting a controlled twist of an alternating type to the central element 42 during its passage.

The twisting device 28 may, for example, comprise a motorized rotatable member which interacts with the central element 42 during its advance to impart to it the alternating rotation about its axis.

Each feed unit 25 comprises a reel 60 for the unwinding of a corresponding optical fibre 43, a storage device 61 of a known type for regulating the unwinding tension and a guide pulley 62 for feeding the optical fibre 43 to the extrusion section 22 in a predetermined direction.

The extrusion section 22 comprises, along the direction of processing 30, a first extruder 65 capable of extruding a polymer layer around the central element 42 and the optical fibres 43 and a first cooling vessel 66 for cooling the polymer layer after the extrusion. The extrusion section 22 may also comprise a second extruder 84 positioned after the first cooling vessel 66 for depositing a protective sheath on the polymer layer and a second cooling vessel 85 for consolidating the material constituting this sheath. Between the first cooling vessel 66 and the second extruder 84 there may be a hot-air drying device 82 for eliminating traces of moisture on the surface of the layer of polymer material.

The extruder 65 may, for example, include an extrusion head comprising a die coaxial with the axis 30, capable of guiding the central element 42 and the optical fibres 43 within an extrusion area into which the polymer material is injected to form the optical core. In particular, this die may have a central channel for the passage of the central element 42 and a plurality of further channels distributed in a ring around the central channel for the passage of the optical fibres 43.

The take-up section 23 comprises a pulling device 86 of a known type, for example a pulling device of the continuous pad type or of the capstan type, capable of pulling the optical core 41 at a controlled velocity v. The take-up section 23 also comprises a motorized take-up spool 87 capable of receiving and storing the optical core 41 and a storage device 88 located before the take-up spool 87 and capable of regulating the spooling tension of the optical core 41.

During the operation of the assembly 20, as a result of the alternating twist imposed on the central element 42 by the twisting device 28, the polymer material and the optical fibres 43 are pulled, from the extrusion area, with an alternating rotary movement about the direction 30, with a winding angle essentially equal to the angle of rotation of the central element. As a result of this rotary movement, the advance at constant velocity in the direction of processing 30 and the particular arrangement (in a ring) of the channels in the extrusion die, the fibres 43 are arranged equally spaced from each other along open helical paths (in other words paths located on a cylindrical surface and resulting from the combination of a translatory motion in a direction parallel to a central axis and an alternating rotary motion about the axis), known also as paths of the "SZ" type. The layer of polymer material of the optical core is free of discontinuities, since it is formed by a single extrusion process and incorporates the whole of the optical fibres 43 and the central element 42.

During the twisting of the central element 42, in the time interval between two consecutive instants of inversion, each optical fibre 43 is subject to a twist about its own axis, in addition to the aforesaid winding about the central element 42.

The Applicant has observed that the angle of twist of the optical fibres 43 is smaller, in absolute terms, than the angle of winding of the fibres about the central element 42. This is due to the constraint on the twist imposed by the guide pulleys 62. This is because, since the twist imposed on each optical fibre 43 in the extrusion area 77 is transmitted to the portion of optical fibre 43 which has not yet entered the extrusion area 77, and since the twist at the corresponding guide pulley 62 is zero, there is an accumulation of twist alternately in both directions between the guide pulley 62 and the extrusion area. As the optical fibre 3 advances into the extrusion area 77, the accumulated twist is subtracted from the twist imposed (by the central element 42) and the resulting twist in the optical fibre 43 is therefore smaller than the twist of the central element 42.

The PMD associated with the optical fibres 43 within the optical cable 42 is a function of the actual twist with which the optical fibres are incorporated in the polymer material.

The Applicant has observed that a cable comprising an optical core of this type has particularly low values of PMD and attenuation. This is because this configuration makes it possible to have a high degree of randomness in the distribution of the stresses acting on the cable over the surface of the optical fibres, and therefore to reduce the group velocity differences of the orthogonal modes of the signals. The presence of an alternating twist also makes it possible to reduce the intrinsic PMD of the optical fibre which is dependent on its geometrical imperfections.

However, the viscous effects present at the interface between the optical fibres and the thermoplastic material on which the fibres are typically deposited may, in this case also, make it difficult to control the twist which is actually imparted. Further difficulties arise from the fact that the actual twist imparted to the optical fibres depends on numerous process parameters, including the distance of the guide pulleys 62 from the extrusion area, the velocity of advance in the direction of processing 30, the angular velocity of twist and the maximum angle of rotation of the twisting device 28. The variation of any one of these parameters affects the value of the actual twist $T_{eff}$ imparted to the optical fibre and therefore makes it different from the predicted value. Usually, the PMD of the different optical fibres present in an optical cable is determined precisely only after the cable has been completed, by measuring the PMD in one portion of the optical cable of suitable length.

With reference to the enlarged view in FIG. 7, the equipment 13 may be integrated into the assembly 20 in such a way as to permit the measurement of the actual twist imparted to one of the optical fibres 43 in the area lying between the corresponding guide pulley 62 and the extruder 65.

Since the actual twist associated with each optical fibre 43 varies in an essentially linear way between the corresponding guide pulley 62 and the extrusion area (where it reaches its maximum value, and then remains essentially unchanged within the optical core), the measurement of the actual twist at one point at a predetermined distance from the extrusion area makes it possible to derive, in a simple and rapid way, the actual value of the twist of the fibre in the extrusion area.

Additionally, if the symmetry of the structure is considered, the twist imparted to the other optical fibres during the process of forming the optical core 41 is essentially equivalent to that of the monitored fibre.

In detail, the equipment 13 is prepared with the diameter sensor 10 positioned on the path of one of the optical fibres 43 between the corresponding guide pulley 62 and the extruder 65. As in the case of the application to the draw tower, the processing unit 12 has its input connected to the sensor 10 to receive and process (in a way similar to that described previously) the diameter measurements. The processing unit 12 also has its output connected to the display unit 16 for the presentation of information to the operator, and also to the twisting device 28 to form a feedback control system (in a way similar to that described previously) which makes it possible to regulate the twist imparted (in this case to the central element 42 and, indirectly, to the optical fibres 43) according to the result of the processing of the diameter measurements.

As has been mentioned, the technique according to the invention can be extended to all processes in which it is desired to measure the actual twist imparted to an optical fibre while the fibre is made to advance in a predetermined direction. The twist of the optical fibre can be imposed deliberately to modify its optical properties (as in the case of the process of drawing or cabling described), or may be a consequence of undesired stresses tending to make the fibre rotate about its own axis during its advance (for example as a result of an imperfect orientation of guide pulleys or of the take-up spool). The latter circumstance may be present, for example, in a process of checking the characteristics of a newly produced optical fibre (commonly known as a "screening" process) in which the fibre is unwound from its take-up spool, is made to pass, by guide pulleys, along a path in which it is subjected to a predetermined tension, and is then rewound on a further spool. This process is carried out to check that the optical fibre does not have any measurable defects. This is because, typically, the presence of a defect of this kind causes the fibre to break during the screening process.

Experimental Results

The experimental results of measurements of the actual twist imparted to an optical fibre in a drawing process carried out in the draw tower 1 are given below.

For the application of the method according to the present invention, a twisting device 6 was used, comprising two facing rollers, of the type described in the previously cited patent application WO 9846536, and a diameter monitor 10 of the type described in the previously cited U.S. Pat. No. 4,280,827.

The parameters set before the start of the process were selected in such a way as to form a "single-mode" optical fibre, with a diameter of approximately 125 μm and low birefringence. In particular:

the drawing velocity $v_f$ was set at 10 m/s;

the maximum reference twist $T_{max,ref}$ was set at 18 revolutions/meter; in previous experiments, the Applicant observed that this value of the maximum reference twist $T_{max,ref}$ makes it possible to obtain an optical fibre with a PMD of less than 0.1 ps/(km)$^{1/2}$;

the initial oscillation frequency $v_0$ of the two rollers of the twisting device 6 was set to 3.3 Hz (corresponding to an inversion of the direction of rotation approximately every 0.3 s);

the measurement frequency of the diameter monitor 10 was set at 500 Hz, corresponding to an acquisition time interval $\Delta t$ of 2 ms;

the number N of values for each time fraction to be processed was set at 2048 (the Applicant selected a value of N which was, as required, a multiple of 2, and which satisfied the relation (3), in such a way as to obtain a high resolution in the measurement) corresponding to a time interval N·$\Delta t$ of approximately 4 s, comprising approximately 12 inversions of rotation.

Figure 5:
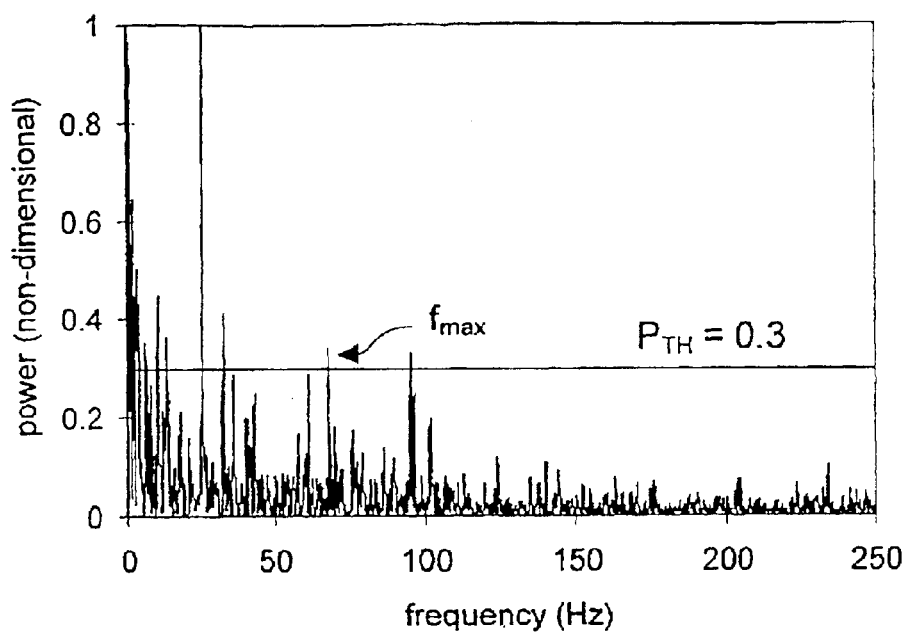
FIGS. 5 and 6 show experimental results obtained with the method according to the present invention.

The average actual twist $T_{eff,ave}$ was initially calculated by means of the technique described with reference to the flow chart in FIG. 3. FIG. 5 shows the power spectrum P(f) found after the execution of the steps corresponding to the blocks 210–240 of FIG. 3. In this spectrum, the power threshold PTH for the identification of the peaks in question (indicated by a horizontal line) was set at 0.3.

As shown in FIG. 5, the maximum frequency $f_{max}$ of the peaks above the threshold value $P_{TH}$ is approximately 96 Hz. Equation (6) was used to find, from the value of $f_{max}$, a maximum actual twist $T_{max,eff}$ of approximately 4.8 revolutions/meter, which is approximately 27% of the maximum reference twist $T_{max,eff}$ which was set.

This spectrum was also used to find, by means of equation (7), a value of average actual twist $T_{eff,ave}$ equal to 1.8 revolutions/meter, after the value of average frequency $f_{ave}$ of the peaks above the threshold, equal to approximately 36 Hz, had been calculated by means of equation (8).

Figure 6:
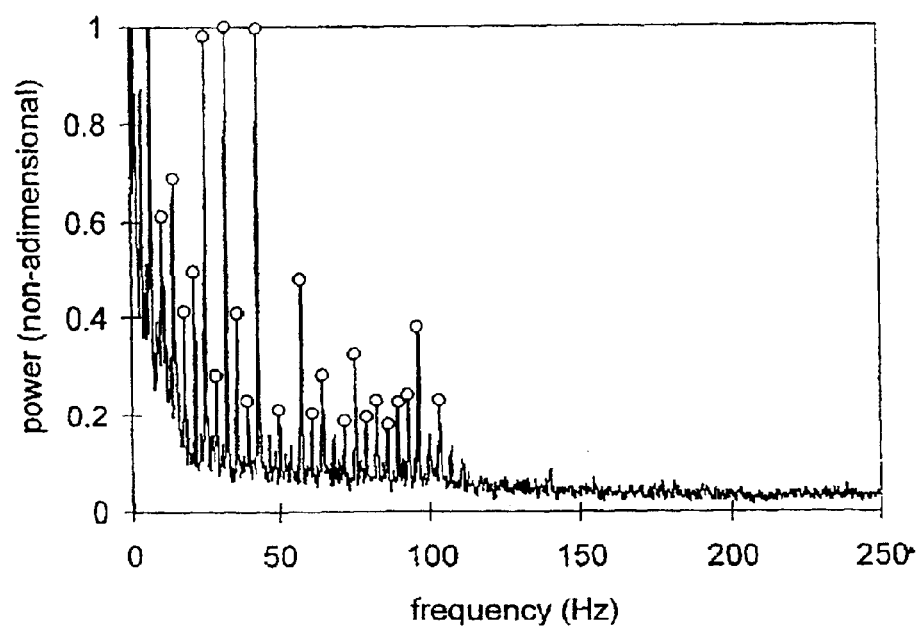

The Applicant also made a measurement using the alternative method described with reference to the flow chart in FIG. 4. For the execution of this measurement, the values of $N_s^*$ and $N_s^{**}$ were selected to be equal to 10 and 40 respectively. FIG. 6 shows a final spectrum obtained after averaging twenty-five consecutive spectra. The peaks of this spectrum, identified by the technique described previously, are identified by a circle on the top of each peak. The signal peaks were identified among these peaks by measuring the subset of the peaks spaced apart by twice the inversion frequency. The maximum frequency of the signal peaks is approximately 104 Hz. Equation (6) was used to find from this value a maximum actual twist $T_{eff,max}$ of approximately 5,2 revolutions/meter, which is approximately 29% of the maximum reference twist $T_{max,ref}$ which is imposed. The average actual twist $T_{eff,ave}$ which can be found from this spectrum is 1,9 revolutions/meter.

As may be seen, the two alternative measurement techniques yield similar results.

What is claimed is:

1. A method of measuring the twist imparted to an optical fibre, comprising the steps of:

(a) advancing said optical fibre in a predetermined direction and at a predetermined velocity;

(b) imparting to said optical fibre, during said step of advancing, a twist about its axis;

(c) measuring the diameter of said optical fibre during said step of advancing, to generate a signal indicating the diameter; and (d) processing said signal (S1) indicating the diameter to obtain a value ($T_{max,eff}$) indicating the twist imparted, said step of processing comprising the step of calculating a transform in the frequency domain (FFT) of said signal.

2. A method according to claim 1, wherein said step of calculating a transform in the frequency domain comprises the application of the Fourier transform to a fraction of said signal.

3. A method according to claim 1, wherein said step of processing comprises the step of determining the power spectrum associated with said transform in the frequency domain.

4. A method according to claim 3, wherein said power spectrum has a set of peaks, and in that said step of processing comprises the derivation, from said set of peaks, of a subset of peaks correlated with said imparted twist.

5. A method according to claim 4, wherein said step of deriving said subset of peaks comprises the steps of comparing the power of each of the peaks of said set with a predetermined threshold and eliminating contributions of said spectrum having a power below said threshold.

6. A method according to claim 5, wherein said step of processing comprises the step of measuring the maximum frequency ($f_{max}$) associated with said subset of peaks.

7. A method according to claim 6, wherein said step of processing comprises the step of dividing the value of said maximum frequency by the value of said velocity of advance to find said value indicating said imparted twist ($T_{max,eff}$).

8. A method according to claim 7, wherein said step of processing comprises, before the measurement of the maximum frequency associated with said subset of peaks, executing a predetermined number of times said steps of measuring the diameter, calculating a transform in the frequency domain, and calculating the power spectrum in such a way as to obtain a predetermined number ($N_s^*$) of power spectra, and also comprises calculating, from said power spectra, an average power spectrum ($P_{ave}(f)$) comprising said subset of peaks.

9. A method according to claim 8, wherein said step of processing comprises the following steps, carried out after said step of calculating said average power spectrum ($P_{ave}(f)$):

determining the total number of peaks ($N_{p,t}$) in said average power spectrum and the number of peaks ($N_p$) of said subset of peaks;

comparing the number of peaks ($N_p$) of said subset with a predetermined percentage (X) of said total number of peaks ($N_{p,t}$); and if said number of peaks of said subset is smaller than said predetermined percentage of said total number of peaks, repeating said steps of measuring the diameter, calculating a transform in the frequency domain, calculating the power spectrum and calculating the average power spectrum.

10. A method according to claim 1, wherein said twist is an alternate twist.

11. A method according to claim 1, wherein said step of processing said signal indicating the diameter comprises the steps, carried out before said step of calculating a transform in the frequency domain, of calculating the average value of said values of diameter and of subtracting said average value from each of said values of diameter.

12. A procedure for processing an optical fibre, comprising the steps of:

(a) advancing, said optical fibre in a direction of advance;

(b) providing a twisting device along said direction of advance to interact with said optical fibre;

(c) operating said twisting device according to at least one predetermined parameter corresponding to a nominal value ($T_{max,ref}$) of twist of said optical fibre;

(d) producing, during said step of advancing, an actual twist in said optical fibre as a result of the said operation of said twisting device;

(e) measuring the diameter of said optical fibre to generate a signal indicating the diameter; and (f) measuring said actual twist during the said step of advancing; wherein said step of measuring said actual twist comprises calculating a transform in the frequency domain (FFT) of said signal indicating the diameter.

13. A procedure according to claim 12, wherein said step of measuring makes it possible to obtain an actual value of twist ($T_{max,eff}$) and in that said procedure comprises:

comparing said actual value ($T_{max,eff}$) with said nominal value ($T_{max,ref}$); and controlling the operation of said twisting device according to the result of said step of comparing.

14. A procedure according to claim 13, wherein said step of controlling comprises one of the following steps, which are alternatives to each other:

keeping the operation of said imparted twist device unchanged when the difference between said actual value ($T_{max,eff}$) and said nominal value ($T_{max,ref}$) is, in absolute terms, less than a predetermined quantity ($T_{max}$);

changing the operation of said twisting device in a first direction such that said actual twist is decreased, when the difference between said actual value ($T_{max,eff}$) and said nominal value ($T_{max,ref}$) is, in absolute terms, greater than or equal to said predetermined quantity ($T_{max}$) and said actual value ($T_{max,eff}$) is greater than said nominal value ($T_{max,ref}$); and changing the operation of said twisting device in a second direction such that said actual twist is increased, when the difference between said actual value ($T_{max,eff}$) and said nominal value ($T_{max,ref}$) is, in absolute terms, greater than or equal to said predetermined quantity ($T_{max}$) and said actual value ($T_{max,eff}$) is less than said nominal value (($T_{max,ref}$).

15. A procedure according to claim 12, further comprising the steps of:

heating a glass preform beyond its softening point;

drawing said optical fibre from this preform in said predetermined direction; and applying a protective coating to said optical fibre.

16. A procedure according to claim 12, wherein said step of advancing said optical fibre comprises feeding said optical fibre to an extruder for the formation of an optical core of an optical cable, and said procedure comprises the further steps of:

feeding to said extruder a supporting element adapted to define a central element of said optical core;

feeding polymer material to said extruder; and imparting to said supporting element a twist about its axis, which causes said twist of said optical fibre.

17. A procedure according to claim 12, wherein said optical fibre is of the low birefringence type.

18. A procedure for processing an optical fibre, comprising steps of:
- (a) advancing said optical fibre in a direction of advance;
- (b) providing a twisting device along said direction of advance to interact with said optical fibre;
- (c) operating said twisting device according to at least one predetermined parameter corresponding to a nominal value ($T_{max,ref}$) of twist of said optical fibre;
- (d) producing, during said step of advancing, an actual twist in said optical fibre as a result of said operation of said twisting device;
- (e) measuring the diameter of said optical fibre to generate a signal indicating the diameter; and
- (f) measuring said actual twist according to the method of any one of claims 1 to 11, during said step of advancing;

wherein said step of measuring said actual twist comprises calculating a transform in the frequency domain (FFT) of said signal indicating the diameter.

* * * * *